(12) United States Patent
Post

(10) Patent No.: US 9,270,203 B2
(45) Date of Patent: Feb. 23, 2016

(54) ELECTRODE GEOMETRY FOR ELECTROSTATIC GENERATORS AND MOTORS

(71) Applicant: Lawrence Livermore National Security, LLC, Livermore, CA (US)

(72) Inventor: Richard F. Post, Walnut Creek, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 287 days.

(21) Appl. No.: 13/796,678

(22) Filed: Mar. 12, 2013

(65) Prior Publication Data

US 2014/0265722 A1    Sep. 18, 2014

(51) Int. Cl.
*H02N 1/00* (2006.01)
(52) U.S. Cl.
CPC ........................................ *H02N 1/00* (2013.01)
(58) Field of Classification Search
CPC ............ H02N 1/00; H02N 1/002; H02N 1/08
USPC ........................................................ 310/309
See application file for complete search history.

(56) References Cited

U.S. PATENT DOCUMENTS

| | | | |
|---|---|---|---|
| 3,094,653 A * | 6/1963 | Le May et al. ................. | 322/2 A |
| 7,834,513 B2 | 11/2010 | Post | |
| 8,264,121 B2 | 9/2012 | Post | |
| 8,278,797 B2 * | 10/2012 | Sashida ........................ | 310/309 |
| 8,643,249 B2 | 2/2014 | Post | |
| 2009/0066298 A1 * | 3/2009 | Post .............................. | 322/2 A |
| 2011/0031844 A1 * | 2/2011 | Post .............................. | 310/300 |

OTHER PUBLICATIONS

Rabinowitz et al., "Electrical Breakdown in Vacuum: New Experimental Observations," J. of App. Physics, vol. 36, No. 4, pp. 1314-1319, (1965).
Trump, "Electrostatic Sources of Electric Power," Electrical Engineering, pp. 525-534, (1947).

* cited by examiner

*Primary Examiner* — Burton Mullins
(74) *Attorney, Agent, or Firm* — John P. Wooldridge

(57) ABSTRACT

An electrostatic (ES) device is described with electrodes that improve its performance metrics. Devices include ES generators and ES motors, which are comprised of one or more stators (stationary members) and one or more rotors (rotatable members). The stator and rotors are configured as a pair of concentric cylindrical structures and aligned about a common axis. The stator and rotor are comprised of an ensemble of discrete, longitudinal electrodes, which are axially oriented in an annular arrangement. The shape of the electrodes described herein enables the ES device to function at voltages significantly greater than that of the existing art, resulting in devices with greater power-handling capability and overall efficiency. Electrode shapes include, but are not limited to, rods, corrugated sheets and emulations thereof.

18 Claims, 14 Drawing Sheets

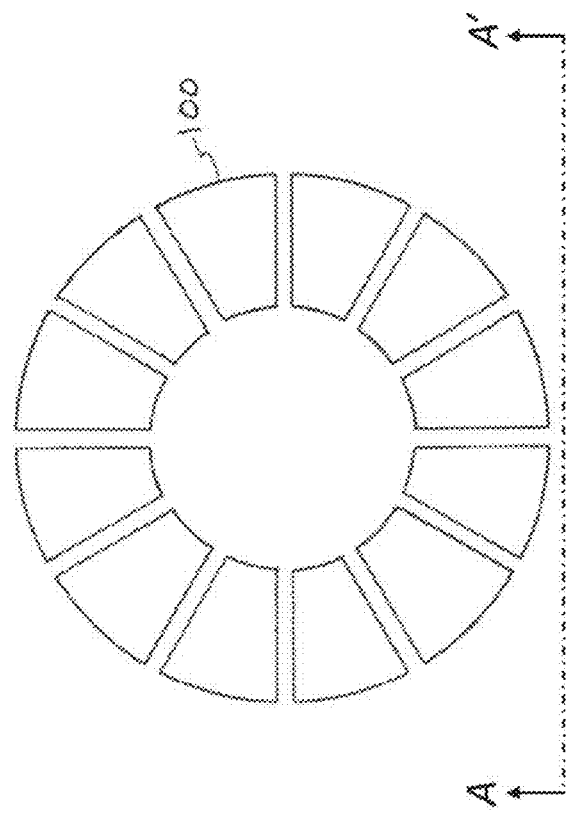
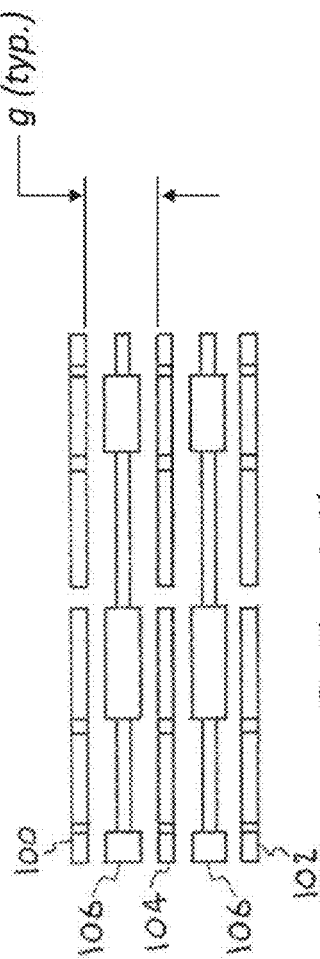
Figure 1A
Figure 1B
*Prior Art*

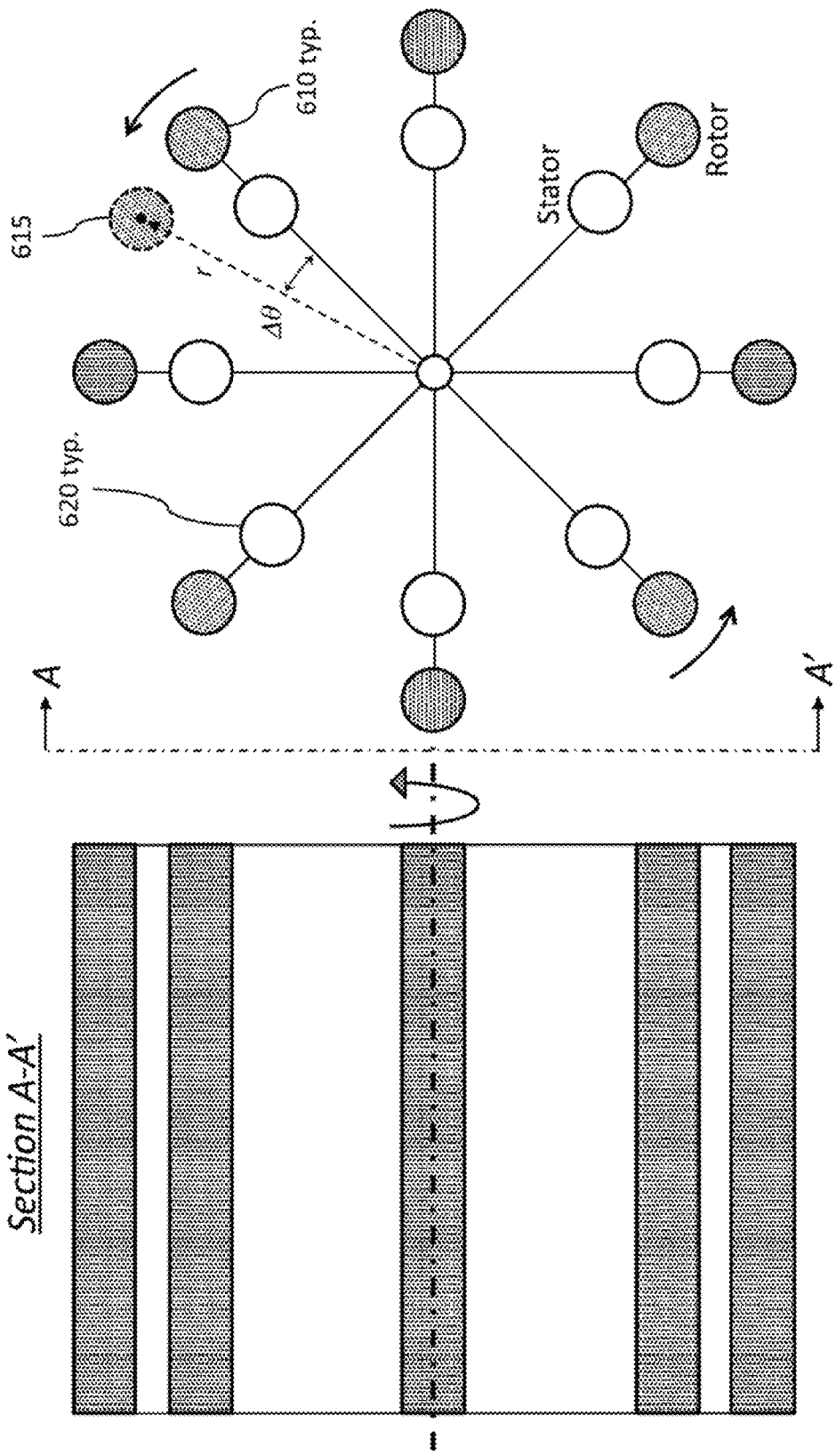

ELECTRODE GEOMETRY FOR ELECTROSTATIC GENERATORS AND MOTORS

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

1. Field of the Invention

The present invention relates to flywheel energy storage systems, and more specifically, it relates to such systems employing electrostatic generator/motors.

2. Description of Related Art

Electrostatic generator/motors, as pioneered by Professor J. G. Trump, and, as described in the prior art, can be operated in either a generator or a motor mode (see, e.g., J. G. Trump, "Electrostatic Sources of Electric Power," Electrical Engineering 525, June 1947). Such devices have application to flywheels for bulk energy storage and robust motors, among myriad commercial and defense uses. This invention describes improved component configurations, electronic drive elements and parametric operational modalities for these devices, resulting in embodiments capable of functioning under the application of higher drive voltages than in the prior art, as well as with relaxed design rules and device constraints.

Electrostatic (ES) generators, an example of which is described in the prior art by the present inventor (U.S. Pat. No. 7,834,513 B2), operate with high electric potentials between stationary plates (stators) and moving plates (rotors), with each plate comprised of an annular array of electrodes. In general, for such ES generators, the achievable power output is determined primarily by four factors: (1) The voltage between the stator and rotor electrodes; (2) The maximum value of the capacitance of the electrode system, as determined by the geometry and material properties of the ES device; (3) The ratio of the maximum and minimum capacitance of the electrode system, $C_{max}$ and $C_{min}$, respectively, that comprises the ES device; and (4) The operating frequency of the ES generator, as determined by the rotation speed of the rotor and the azimuthal periodicity of the segmented electrodes. Of these four factors, the key metric, in terms of device capability, is the first item listed above, namely, the operating voltage, as applied to the ES device. This follows, since it is known that for ES generator and motors, the characteristic electrical power that governs the operation of the device, be it the power output in the case of ES generators, or, the input drive power, in the case of ES motors, varies as the square of the peak voltage appearing between the opposing set of electrodes. A secondary metric pertains to the fourth item listed above, namely, the operating frequency of the device. In general, the operating frequency is equal to the product of rotation rate of the rotor and the number of annular electrodes about the circumference of the same.

Given that the ES devices cited in the above-noted prior art employ a so-called "resonance effect" to enhance the performance of the device, the third item listed above is not as critical a parameter as it is for other prior art ES systems that do not incorporate such parametric enhancements. Hence, in the present case, lower values of the capacitor ratio, $C_{max}/C_{min}$, can now be of practical use, as opposed to devices in the absence of parametric enhancements, whereby such low capacitance ratios may otherwise have been insufficient to achieve a given maximum power output, all else being equal. This invention teaches device embodiments that involve novel electrode geometries, which, relative to the prior art, can enable the application of greater ES device voltage levels across the electrodes (recall Item 1 above), as well as extending the range of allowable operating frequencies (recall Item 4 above). An example where such improved ES generator/motor systems can prove useful is in its application to flywheels for bulk energy storage.

In general, electrostatic (ES) generator/motors involve the use of an assembly of rotating and stationary elements that together comprise a condenser (or, capacitor), the capacitance of which varies periodically with the motion of the rotating elements relative to the fixed elements. An example of the prior art is shown in FIG. 1A (top view) and in FIG. 1B (Section A-A': side view). Turning now to FIG. 1A, a circular array of fan-like stationary elements, 100, is depicted. Below this stationary array of elements is a similar circular array of elements, which is allowed to rotate about a vertical axis, referred to as the "rotor." FIG. 1B shows a cross-sectional side view of the overall ES structure, showing an embodiment consisting of a set of two rotors, 106, with each respective rotor also comprised of a circular array of fan-like elements. Each respective rotor plate 106 is bound on each circular surface by a respective pair of stationary arrays, of opposing, fan-like elements. In the dual-rotor example shown, there are two equivalent pairs of stators, arranged in a stacked configuration, with the central stator 104 common to both. One pair of stators is comprised of plates 100 and 104; and, the second pair of stators is comprised of plates 104 and 102, respectively. The rotor plates are allowed to rotate about an axis oriented orthogonal to the plane of the fixed plate(s), as shown in FIG. 1A.

As shown in FIG. 1B, the rotors, 106, are comprised of a set of annular fan-like elements, with each element having a thickness greater than the basic substrate of the rotor disc. In general, the thick fan-like sections elements of the rotor can consist of a metallic (conductive) material, a dielectric material or combinations thereof. Each pair of fixed fan-like elements, which comprises the opposing stationary plates, forms a capacitor of a fixed gap, g, in between which, each respective rotor rotates. As the moving discs revolve about its axis, the capacitance between each pair of opposing stationary plates will vary periodically, owing to differences in the effective gap dimension, g, and the properties of the rotor material, as each fan-like element of the rotor passes between each respective annular capacitor element in the array. Note that this basic configuration of FIGS. 1A and 1B can be classified as a planar geometry, since the effective capacitors are formed via the opposing planar surfaces of the stators and rotor.

In general, ES structures can be configured either as an electrostatic (ES) generator or as an electrostatic (ES) motor, dependent upon the details of an electrical circuit that includes this device. In the so-called "generator mode" of operation, rotation of the moving element results in the generation of an ac voltage arising from the basic equation for the voltage across a charged condenser when the capacitance varies with time, as indicated by Equation (1):

$$V(t) = \frac{q}{C(t)} \text{ (Volts)} \qquad (1)$$

Here q (Coulombs) is the charge on the condenser and C(t) (Farads) is the time-varying value of the capacitance, the latter owing to the relative rotation of the rotor with respect to the fixed stators. If the capacitance varies periodically with time, then the ac output of the electrostatic generator will also be periodic, with an ac waveform that depends upon the geometry of the time-varying condenser and upon the charging circuitry that is employed.

The variable-capacity system described above is a "reciprocal" device, in that it is capable of functioning either as a generator or a motor, depending only upon the circuitry to which it is attached. As a generator, an example of which is an energy storage flywheel, the generator output is high-frequency alternating current, which can easily be converted to mains-frequency power. As an example, the high-frequency generator output can be first rectified to dc, with the resultant dc output driving an electronic inverter to produce a 60 Hz output, the latter suitable for commercially powered devices.

By reciprocity, operation of the system in the so-called "motor mode" requires a drive circuitry that generates a pulse-like waveform, which is synchronized with the rotation frequency and phase of the rotating elements.

In the electronic charging circuits such as those described in the prior art, dc power supplies are connected in series with charging inductors to the time-varying capacitors that form the ES generator. When these inductors are properly specified, an effective "parametric resonance" effect occurs, essentially coupling the LC-based charging frequency and the time-varying generator output, the latter being a function of the rotation rate and the number of fan-like annular elements in the array. This parametric effect resonantly increases the voltage gradient across the generator electrodes and enhances its power output and efficiency, far beyond that which can be achieved with the original resistive (instead of inductive) charging circuits such as those used in the pioneering work on ES generators by Trump.

FIG. 2 depicts an example of a prior art drive circuit, in which case a dual-balanced ES generator schematic diagram is shown. This circuit employs the parametric resonance effect noted in the prior art for enhanced device operation. The circuit has been shown by computer code simulation to enhance this parametric resonance effect. This approach enables the use of relatively low drive voltages, as well as relatively small capacitive ratios, $C_{max}/C_{min}$, to realize enhanced ES device performance over the prior art. In the circuit of FIG. 2 the parametric resonant effect is achieved by the proper choice of the value of the inductances in the circuit, based on the following: Starting at the point 254 in that circuit there is first an inductance (and its internal resistance), represented by 256 and 258. Next there are two time-varying condensers (260 and 360) connected in series. These condensers are followed by the inductance 356 and its internal resistance, with the circuit in question terminating at 354. This circuit represents a series-resonant electrical circuit, the resonant frequency of which will vary over a band of frequencies as the capacitors 260 and 360 vary synchronously between their maximum and minimum values. Strong parametric resonance occurs when that band of frequencies overlaps the frequency at which the capacities are varying. This latter frequency is determined by the product of the rotation speed of the system and the azimuthal number of periodic electrodes in the generator/motor (e.g., that number is 8 in FIG. 6A). If the rotation speed is constant fixed values can be used for inductances 256 and 356 of FIG. 2. If the rotation speed varies the inductance values must change accordingly. Such a change could be accomplished in several different ways, e.g. switching in or out additional series inductors, mechanically tuning the inductance (in the manner it was accomplished in early radio receivers), or by controlled saturation of the cores of iron-cored inductors. Fortunately, as analysis has shown, as long as there is an overlap between the operating frequency and the band of resonance the parametric resonance effect will be strong so that this inductance "tuning" need not be precise.

As an example, this circuit can be used to charge the ES device, as depicted in the prior art embodiment of FIG. 1A and FIG. 1B. In this case, each respective variable capacitor, 260 and 360, in FIG. 2 corresponds to a respective variable capacitor in the device shown in FIG. 1B, with each such variable capacitor formed by stationary plates 100 and 104, or by stationary plates 102 and 104, within which revolves a respective rotor plate 106.

Referring again to FIG. 2, each of the two balanced portions of the circuit is comprised of a time-varying capacitor, C(t). 260 [360], a fixed coupling capacitor, C, 268 [368], and a charging inductor, L, 256 [356], with each inductor possessing an internal resistance, represented by a resistor R, 258 [368], which together drives a load 400. By using the load to provide electrical coupling between the two circuit portions, the net effect is to lower the optimum load impedance, while at the same time, increasing the output power.

Each respective time-varying capacitor, C(t), consists of a pair of fixed stator assemblies, between which is an elongated rotor. Owing to the balanced nature of the circuit in the prior art example, the rotors operate at a virtual ground potential and, therefore, do not require a direct electrical connection to ground. Finally, the input to each portion of the balanced circuit is driven by a respective power supply at a voltage, V, 252 [352], each of which is of an opposing polarity.

SUMMARY OF THE INVENTION

An exemplary embodiment of the present invention provides and electrically isolated rotor. It further provides a first set of stator electrodes that are made of either rods or corrugated sheets. Another set of stators are in axial alignment and spaced apart from the first stator. The rotor and stators include electrically conductive material. Thus, one embodiment includes stationary and rotatable members that are axially oriented, annular arrays of identical rods. The annular structure that contains the rods for the stator element is typically at one radius from the axis of rotation and the annular structure that contains the opposing rods of the rotor element is typically at a second radius that is larger than the radius of the stator. A variable capacitor is formed between the rotor and the first stator and a second variable capacitor is formed between the rotor and the second stator. As the rotor rotates, the gap of each capacitor varies monotonically.

A series-resonant electrical circuit is formed in a circuit connected from the first variable capacitor, through the rotor to the second variable capacitor. The capacities of the first capacitor and the second capacitor vary at a first frequency as the rotor rotates. The series-resonant circuit comprises a resonant frequency that varies over a band of frequencies as the rotor rotates. Parametric resonance occurs when the first frequency overlaps the band of frequencies. The configuration can be electrically connected in a variety of circuits to form the series-resonant circuit. Such circuits will be apparent to those skilled in the art upon understanding the teachings herein. For example, the configuration can be used with the circuit of FIG. 2. In such case, the first inductor is electrically connected to the first variable capacitor. The second inductor is electrically connected to the second variable capacitor. A circuit connected from the first inductor, through the first capacitor and the second capacitor to the second inductor comprises a series resonant circuit having a resonant frequency that varies over a band of frequencies as the rotor rotates. The first inductor comprises a first inductance and the second inductor comprises a second inductance. These inductances are selected so that said band of frequencies overlaps the frequency of capacitance variation in the first capacitor and the second capacitor at a desired rotation speed of the rotor. Energy can be coupled in and out of the system in a variety of ways. For example, energy can be coupled out by connecting a first capacitor between the first inductor and the first variable capacitor and further connecting a second capacitor between the second inductor and the second variable capacitor. A load can be connected between the first capacitor and the second capacitor. Conversely, a driver circuit connected between the first capacitor and the second capacitor can couple energy into the system.

In another embodiment, a first stator and a second stator each have a set of rods that extend toward a central axis. A rotor rotates about the central axis and includes rods that extend away from the rotor. This "inverted" embodiment operates similarly to the embodiment described above. That is, as the rotor rotates, a first variable gap between the rods of the first stator and those of the rotor changes monotonically. As the rotor rotates, a second variable gap between the rods of the second stator and those of the rotor also changes monotonically. The rotor and both stators comprise electrically conductive material. The rotor is electrically isolated. The first stator and the rotor form a first variable capacitor and the second stator and the rotor form a second variable capacitor. A series-resonant electrical circuit is, e.g., as shown in FIG. 2, is formed in a circuit connected from the first variable capacitor, through the rotor to the second variable capacitor. The capacities of the first capacitor and the second capacitor vary at a first frequency as the rotor rotates and the series-resonant circuit comprises a resonant frequency that varies over a band of frequencies as the rotor rotates. Parametric resonance occurs when the first frequency overlaps said band of frequencies.

BRIEF DESCRIPTION OF THE DRAWINGS

The accompanying drawings, which are incorporated into and form a part of the disclosure, illustrate embodiments of the invention and, together with the description, serve to explain the principles of the invention.

FIG. 1A depicts a top view of a multi-element electrostatic motor of the prior art, comprised of fan-like, planar electrodes.

FIG. 1B depicts a cross-sectional side view of the multi-element electrostatic motor of FIG. 1A, of the prior art.

FIG. 6A depicts a top view of a multi-element stator/rotor electrostatic motor embodiment, comprised of axially directed rod-like electrodes.

FIG. 6B depicts a cross-sectional side view of the electrostatic motor embodiment of FIG. 6A.

DETAILED DESCRIPTION OF THE INVENTION

As discussed above, the basic configuration of FIGS. 1A and 1B can be classified as a planar geometry, since the effective capacitors are formed via the opposing planar surfaces of the stators and rotor. By contrast, in some embodiments of the present invention, the stators and rotors are comprised of an ensemble of axially oriented rods. In other embodiments, the stators and rotors are comprised of a set of axially oriented corrugated metallic surfaces. Hence, these exemplary embodiments differ significantly from that in the prior art of FIGS. 1A and 1B, in which case, the stator and rotor assemblies are comprised of flat discs with planar electrodes and with fan-like features.

Figure 2:
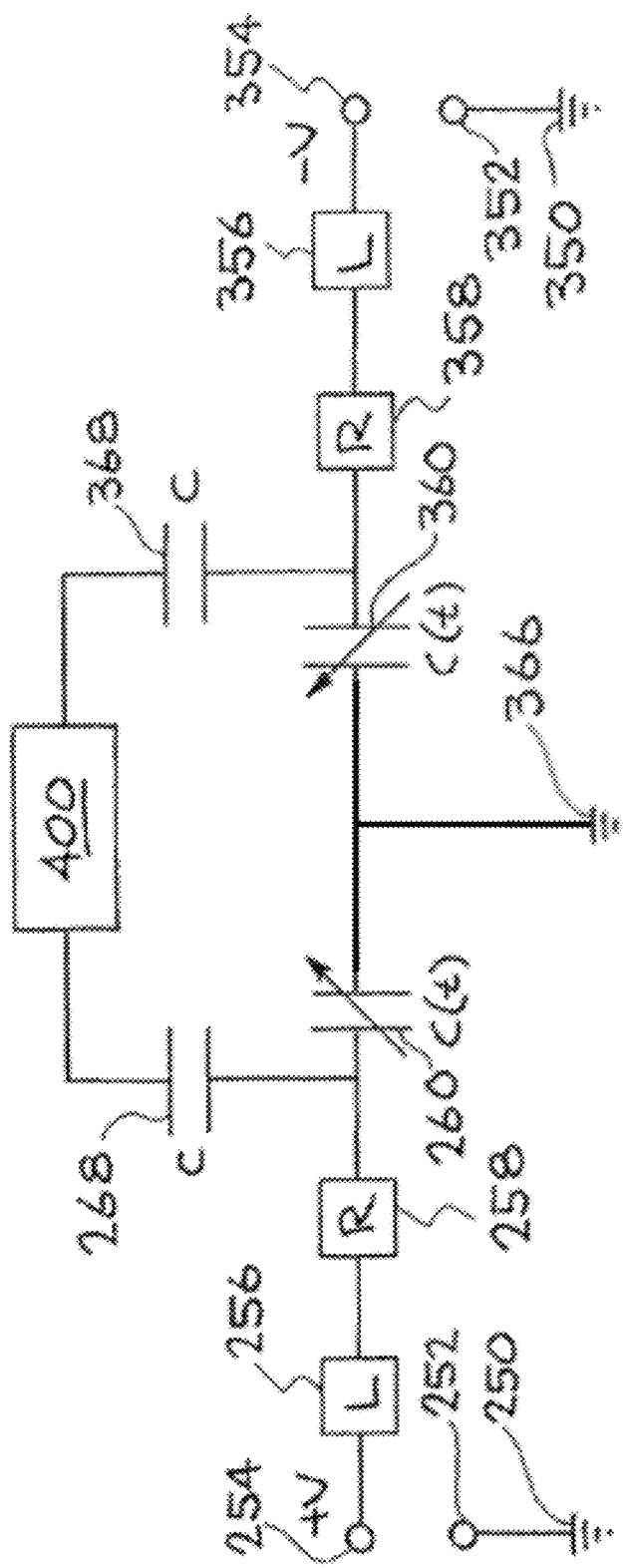
FIG. 2 shows a schematic drawing of a balanced E-S generator circuit in the prior art.
Figure 3:
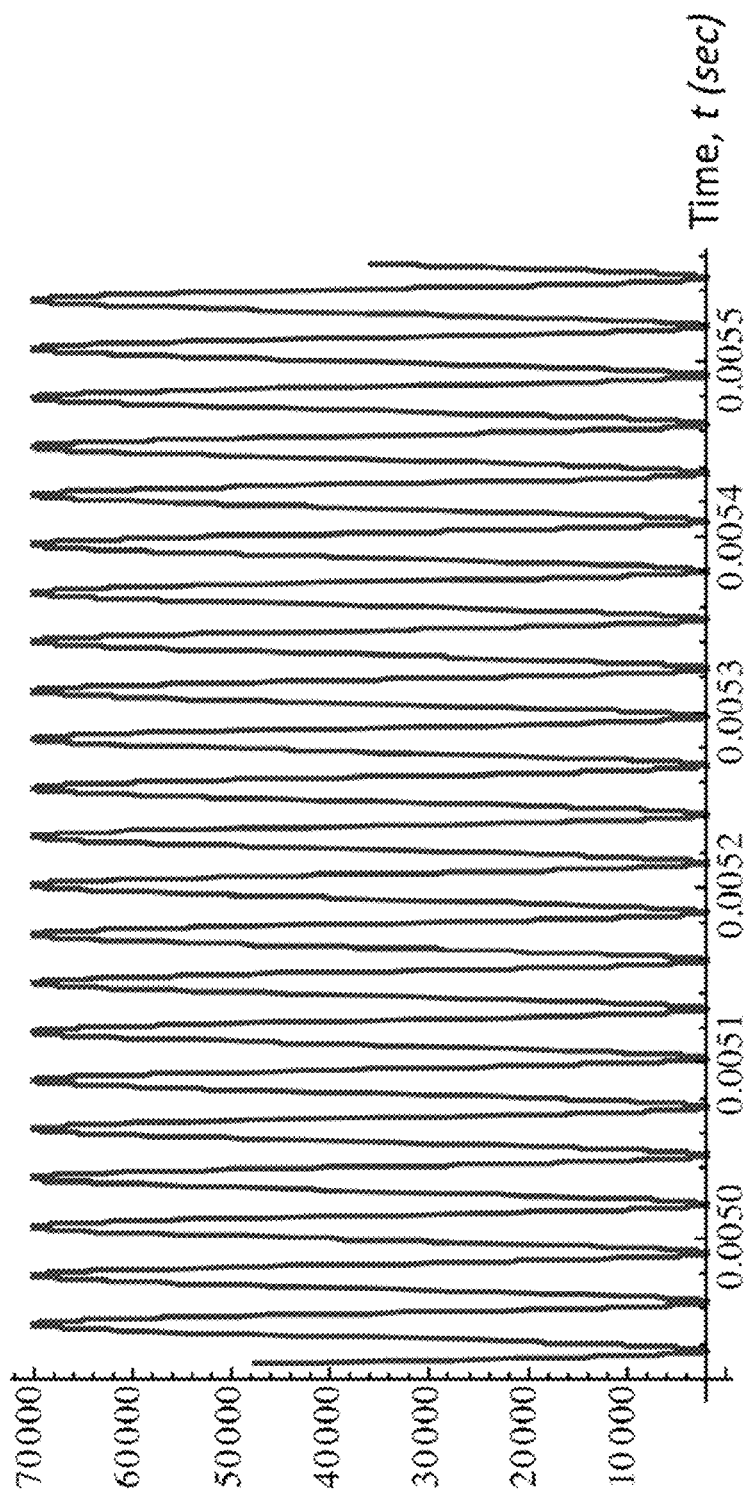
FIG. 3 shows results of a computer simulation of the voltage versus time between the rotor and stator electrodes of an ES generator, employing the circuit shown in FIG. 2.

Computer simulations of ES devices were performed to gain perspective into the selection of a preferred embodiment for enhanced device performance. FIG. 3 shows an example of a computer simulation of the voltage appearing across a pair of ES generator electrodes as a function of time, when driven by a dual-balanced circuit, similar to that depicted of FIG. 2. For this simulation, it is assumed that a preferred embodiment in the form of a rod-rod stator/rotor structure is employed, with a minimum gap of 2.5 mm. In this example, the time-dependent peak drive voltage is ≈70 kV. This numerical result will be discussed below in the context of the design of the preferred rod-rod embodiment.

Figure 4:
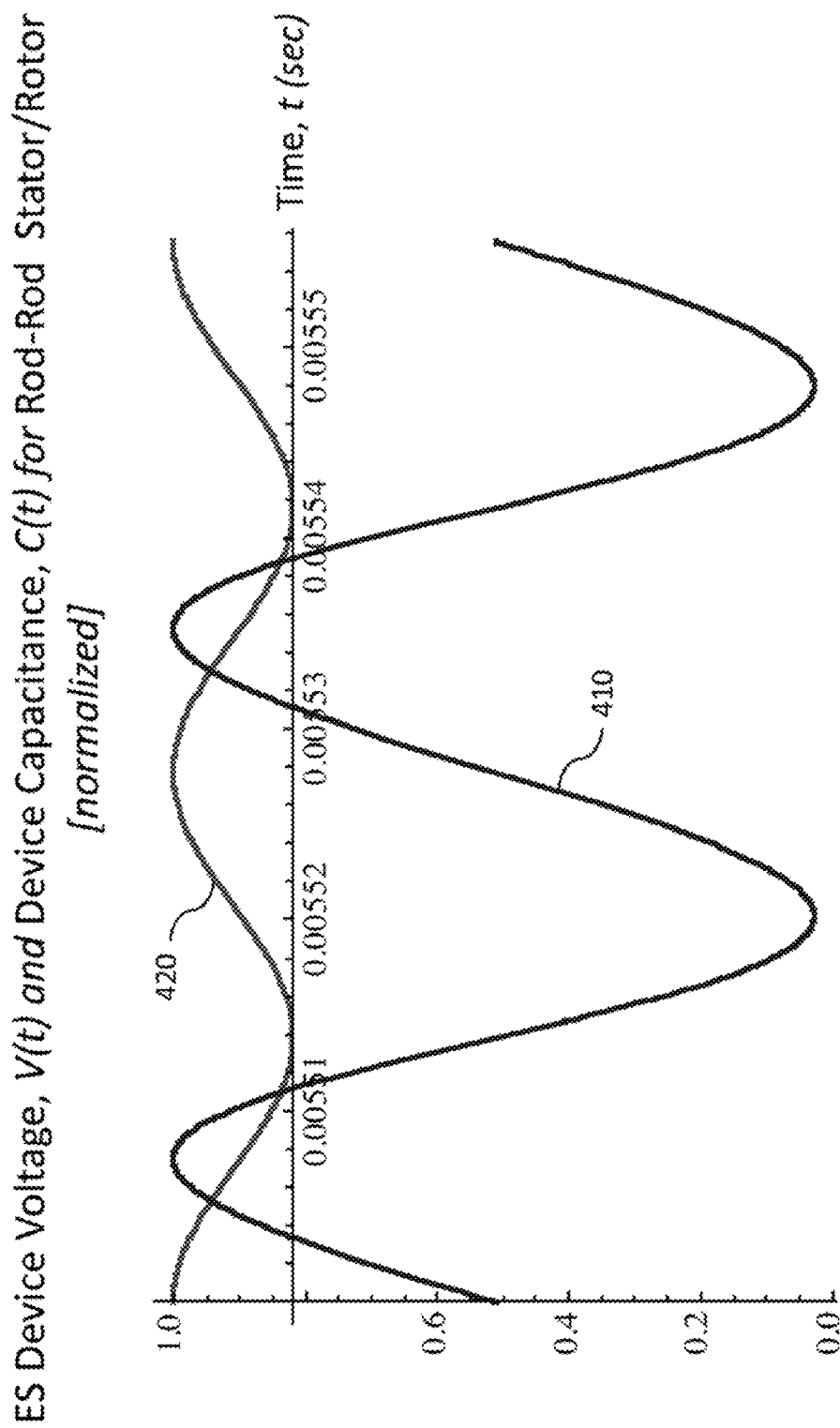
FIG. 4 shows results of a computer simulation of the normalized variation of voltage and the normalized variation of capacity versus time in a rod-rod ES generator rotor/stator system of the present invention.

Turning now to FIG. 4, further results of a computer simulation of an ES device are shown. For this simulation, the same device structure is assumed as that used in the previous simulation. In FIG. 4, two key time-dependent parameters are displayed: the normalized ES device voltage, 410, and the normalized inter-electrode capacity 420. In terms of the ES efficiency, a key design rule is to maximize both the voltage across the device as well as the capacitance ratio, $C_{max}/C_{min}$, preferably both maxima occurring at the same point in the ES cycle. Priority is given to the voltage parameter, as the ES device power scales with the square of the voltage.

Given these design rules, we first consider the inter-electrode voltage. The computer simulations shown in FIG. 4 indicate a departure from optimal ES device performance. Specifically, it is seen that the inter-electrode voltage at the time of maximum capacity is only about 55 percent of its maximum value. As a numerical example, recall that the example depicted in FIG. 3 revealed a peak voltage of 70 kV. Hence the inter-electrode voltage at the time of maximum capacity is only about 38 kV, namely, 55% of 70 kV (which occurs at a minimum gap dimension of 2.5 mm). As will be discussed below, this voltage is well below the predicted breakdown voltage for this gap dimension and for the preferred choice of electrode shape and device configuration (i.e., axially oriented rods). Given the square-law dependence of ES power on voltage, a value of only 55% of the peak available voltage across the electrodes indicates a significant penalty in performance.

In terms of the capacitance ratio, computer simulations (recall FIG. 4) further indicate that the maximum inter-electrode voltage occurs when the capacitance ratio, $C_{max}/C_{min}$, has dropped to about 50 percent of its maximum value, at which point the gap is much larger than 2.5 mm. We note that the maximum capacitance ratio is 1.2 in this simulation.

The exemplary electrode geometry embodiment, to be described below, is aimed at addressing two significant shortcomings inherent in the prior art. One shortcoming is that the voltage across the electrode system when it is at its position of maximum capacity is only about one-half of its peak value. The second shortcoming is that the peak value of the voltage occurs only after the inter-electrode capacity has fallen to approximately the halfway point between its maximum and minimum value.

The selection of preferred device geometries is dictated by at least two criteria. The first, and, most important criterion is that the geometric configuration of the electrode elements should be one that enhances its voltage-holding capability (i.e., maximizes the breakdown voltage threshold), given the dependence of the ES device power on the square of the voltage. The second criterion is that the decrease in capacity—which occurs as a result of rotation of the ES generator rotor electrodes from its angular position of maximum capacity toward its angular position of minimum capacity—should preferably be accompanied by an increase in the gap between the facing surfaces of the electrodes. This condition follows, since it is during the subsequent phase of the rotor rotation cycle, wherein the gap decreases, that it is optimal for the capacity to increase, as the voltage across the capacitor concomitantly increases.

Figure 5A:
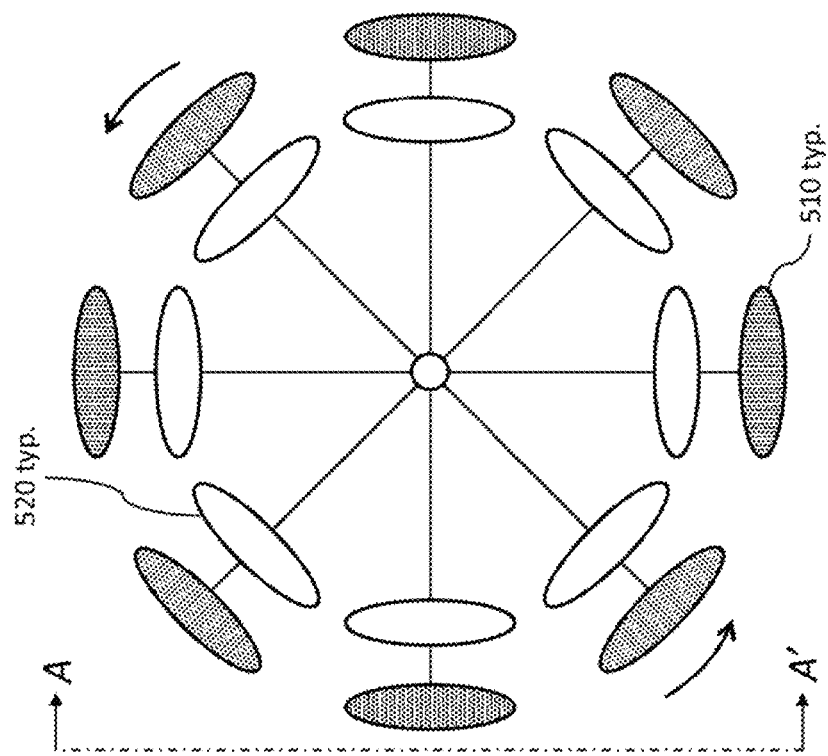
FIG. 5A depicts a top view of a multi-element stator/rotor electrostatic motor of the prior art, comprised of axially directed strip-like (or, strap-like) electrodes.
Figure 5B:
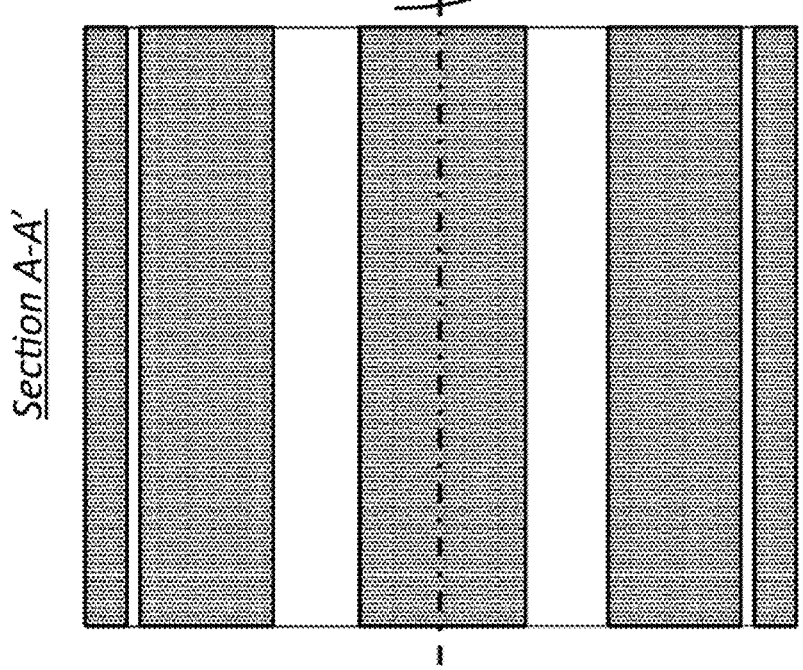
FIG. 5B depicts a cross-sectional side view of the electrostatic motor of FIG. 5A, of the prior art.

To fully appreciate this conjecture, we consider a counter example. Specifically, let us consider a case of an electrode configuration that does not meet either of these criteria. An example of such a case is shown in FIG. 5A and FIG. 5B. Shown here is a prior art ES device, comprised of rotor 510 and stator 520 electrodes. The electrodes consist of axially directed metallic straps (or, strips) with rounded edges. Each electrode element is in the form of an elongated strap-like element—essentially, in the shape of an elliptical parallelepiped—with each respective, lengthwise parallelepiped axis oriented parallel to the rotational axis of the ES generator, as depicted in the cross sectional view A-A' of the structure, as shown in FIG. 5B. One can view this device as a cylindrical, cage-like structure, with an inner set of fixed annularly positioned straps (the stator), concentric with an outer set of similarly annularly oriented straps (the rotor), the latter of a greater diameter. In addition, the outer ensemble of straps rotates about the axis of the device.

In the specific azimuthal orientation shown in FIG. 5A, each respective rotor element is radially aligned with each respective stator element at this point of the ES device cycle. Typically, this point corresponds to the minimal separation of the stator with respect to the rotor, thereby typically resulting in the maximum capacitance between the pair of electrodes. During device operation, as the rotor revolves about its axis, the respective rotor and stator elements periodically go into and out of radial alignment with each other. Hence, as the rotor revolves, the capacitance between the rotor and stator elements also varies periodically.

Several aspects of this choice of electrode geometry can readily be appreciated as not being optimal, per the teachings herein. First, this geometry does not maximize the breakdown voltage between the electrodes because the voltage gradient at all points on the facing surfaces is at, or near to, its maximum value, thus increasing the probability of breakdown. This property also makes it more difficult to "condition" the electrode surfaces by subjecting them to voltages that intentionally cause breakdown between microscopic field-emitting imperfections of the surfaces. Second, in this geometry, the decrease in rotor-stator capacity does not necessarily result in an increase in the minimum gap between the electrode surfaces. In fact it may actually result in a decrease in the minimum gap from purely geometric considerations; namely, the effect on the inter-electrode gap arising from the rotation of a set of planar electrodes located on one cylindrical surface that faces a set of stationary, planar electrodes, the latter located on a slightly smaller radius cylindrical surface, both concentric about a common axis.

Figure 6C:
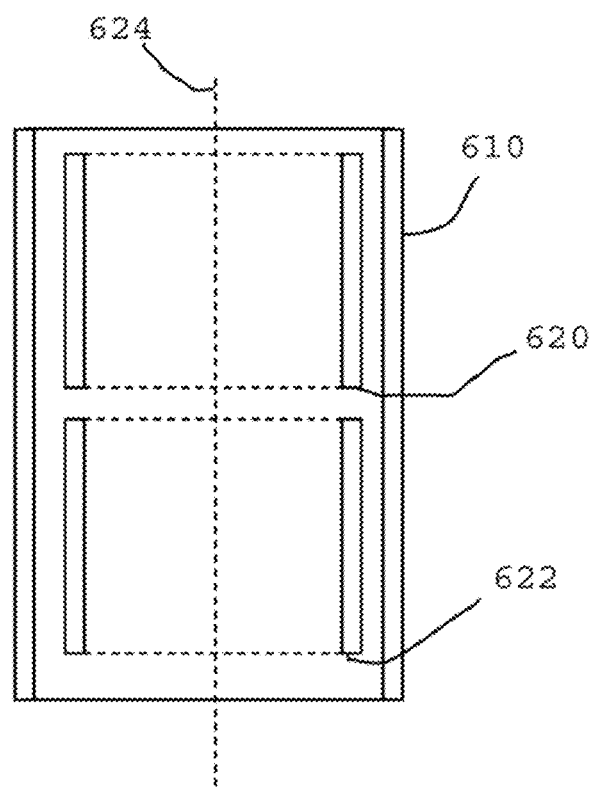
FIG. 6C depicts an axially oriented cross-sectional side view of the electrostatic motor embodiment of FIG. 6A.

An exemplary embodiment of the present invention is shown in FIG. 6A and FIG. 6B, which satisfies both of the above-cited criteria. In this embodiment, the rotor 610 and stator 620 electrodes are comprised of either rods or by corrugated sheets, the latter emulating the rod assemblies in the areas where they face each other. Not shown in this figure are another set of stators 622 in axial alignment and spaced apart from stator 620. Note axis of rotation 624. The operation of this embodiment is similar to that of the embodiment of FIG. 11. In the embodiment shown in FIGS. 6A-6C, the stationary and rotatable members of the ES device are axially oriented, annular arrays of identical rods. The annular structure that contains the rods for the stator element is typically at one radius, whereas, the annular structure that contains the opposing rods of the rotor element is typically of a second radius (labeled in FIG. 6A as "r"), whereby the former radius is less than that of the latter radius. FIG. 6C shows a cross sectional side view of the embodiment of FIG. 6A.

Recall from FIG. 5A, that in the prior art, the cage-like sets of electrodes were comprised of metallic straps. This subtle change in the shape of the electrodes—rods instead of straps—results in fundamental differences in the performance of the ES generator/motor device, which are not necessarily obvious or anticipated, given the apparent similarity in cross section of the various electrodes. One key result is that the preferred rod-based embodiment enables ES devices to function under higher operating voltages, which improves the device efficiency. Another key aspect is that this embodiment results in a more optimal correlation of the stator/rotor rotationally dependent device capacitance, relative to the rotational dependent voltage that appears across the elements, thereby further improving the device performance. In the analyses that follow, we discuss the embodiment that employs rods as electrodes. The conclusions reached herein in the case of an ensemble of rods are similar to the embodiment comprised of corrugated surfaces.

Figure 7:
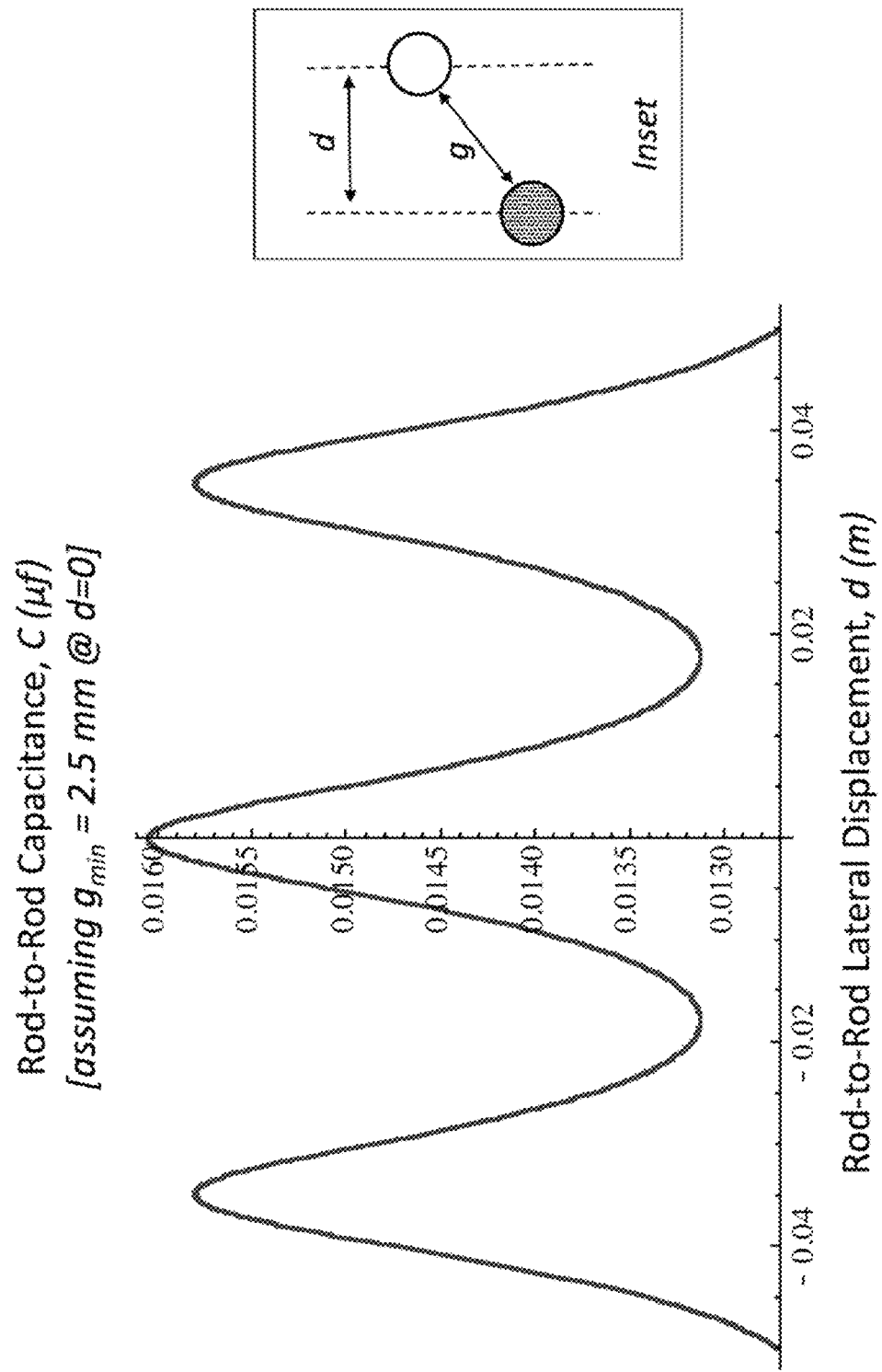
FIG. 7 shows results of a computer simulation of the rod-to-rod capacitance as a function of the rod-to-rod lateral displacement, assuming a minimum gap of 2.5 mm. The inset indicates the dimensional variables, g and d.

FIG. 7 shows results of a computer simulation of the device of FIG. 6A. Shown here is a plot of the rod-to-rod capacity variation as a function of the stator-to-rotor lateral electrode displacement, d. The relative, lateral displacement of the electrodes occurs as the rotor rotates through a finite angle with respect to the stator (recall FIG. 6A). As the lateral displacement, d, changes, the effective capacitance formed between the stator and rotor rods concomitantly changes, owing to the differences in gap, g, which separates the pair of rods. (The inset of FIG. 7 shows a sketch of a pair of rods, indicating the parameters, g and d.) For this simulation, a pair of identical stator and rotor rod-shaped electrodes is assumed, with all rod elements possessing a diameter of 12.7 mm. Furthermore, the rods are assumed to have a minimum gap separation of 2.5 mm, which occurs when the lateral displacement d=0. The analysis of the inter-rod capacitance (of FIG. 7) implicitly assumes that the lateral displacement, d, is a reasonable approximation to the actual rotational displacement along the circumferential arc of the rotor in FIG. 6A. This assumption is equivalent to the small-angle approximation, as sketched in FIG. 6A, whereby the lateral displacement, $d \approx r\Delta\theta$, where $\Delta\theta$ is the angle between the stator and rotor elements.

Returning now to the simulation in FIG. 7, the calculated maximum-to-minimum capacitance ratio, $C_{max}/C_{min} \approx 1.20$. This value is slightly lower than that typically achieved with the prior art strap/strip rotors and stators. Nevertheless, as we next discuss, owing to its superior voltage-handling ability, the power output from the rod-rod system—when further enhanced via the "parametric" resonance mechanism (as described by the present inventor in U.S. Pat. No. 7,834,513 B2)—can be much higher than the power from the prior art strip-based and planar-based stator/rotor electrode embodiments. As we discuss next, the voltage-handling capability of an ES device, is essentially limited by the breakdown-voltage threshold, which is superior in the preferred rod-rod and corrugated electrode embodiments discussed herein.

We now turn our attention to the salient electrical breakdown characteristics of the dual-rod system. Recall, that this choice of electrode constitutes an exemplary embodiment whereby both the rotor and stator electrode elements are comprised of axially oriented, annular arrays of rods. A literature search of prior experiments that investigated the effect of electrode geometry on the breakdown voltages of spark-conditioned metal surfaces shows that the rod-rod geometry is far superior to the flat strip-flat strip geometry (see, e.g., E. E. Donaldson and M. Rabinowitz, Journal of Applied Physics 36, 1314 [1965]). That is, the maximum applied voltage placed across a set of opposing electrodes that can be sustained prior to the onset of an electric-field-induced discharge, will be greater in the case of a rod-rod embodiment relative to that of a strip-strip embodiment.

Figure 8:
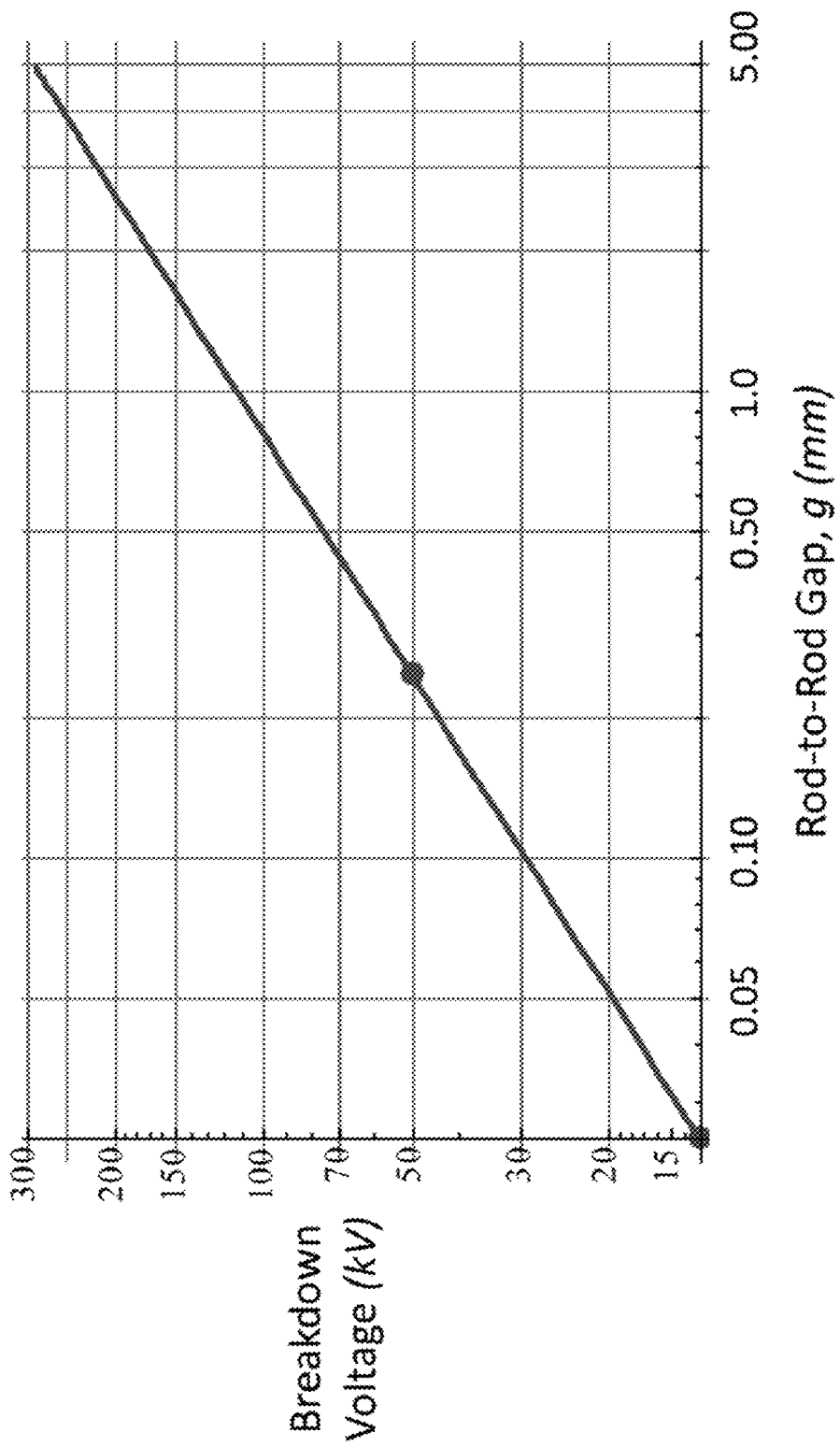
FIG. 8 shows a log-log plot of the rod-rod breakdown voltage versus displacement (the gap) between two 303 stainless steel 12.7 mm diameter rods, indicating experimental data points and a linear curve fit.

FIG. 8 shows a log-log plot of the voltage-holding capability (i.e., the discharge breakdown threshold voltage) as a function of the rod-to-rod gap, g. In this case, the rod-rod system is comprised of #303 stainless steel rods, each with a diameter of 12.7 mm. FIG. 8 consists of two breakdown-threshold measurements, with each data point representing a different rod-to-rod separation (represented by the two dots). Also, in FIG. 8, is a straight line, drawn through the pair of data points. Given the log-log nature of this plot, it follows that a straight line can be represented by the functional relationship in Equation (2):

$$V_{breakdown} = m \times g^n (kV) \qquad (2)$$

Here, $V_{breakdown}$ (kV) is the threshold voltage at which a breakdown occurs, g (mm) is the rod-to-rod gap, and, m and n are best-fit constants. A standard curve fitting routine results in following values of the constants: m=112.51 kV and n=0.585. Beyond the experimental point at $g \approx 2$ mm, the linear plot represents an extrapolation of the experimental results to greater values of the rod-to-rod separation.

Figure 9:
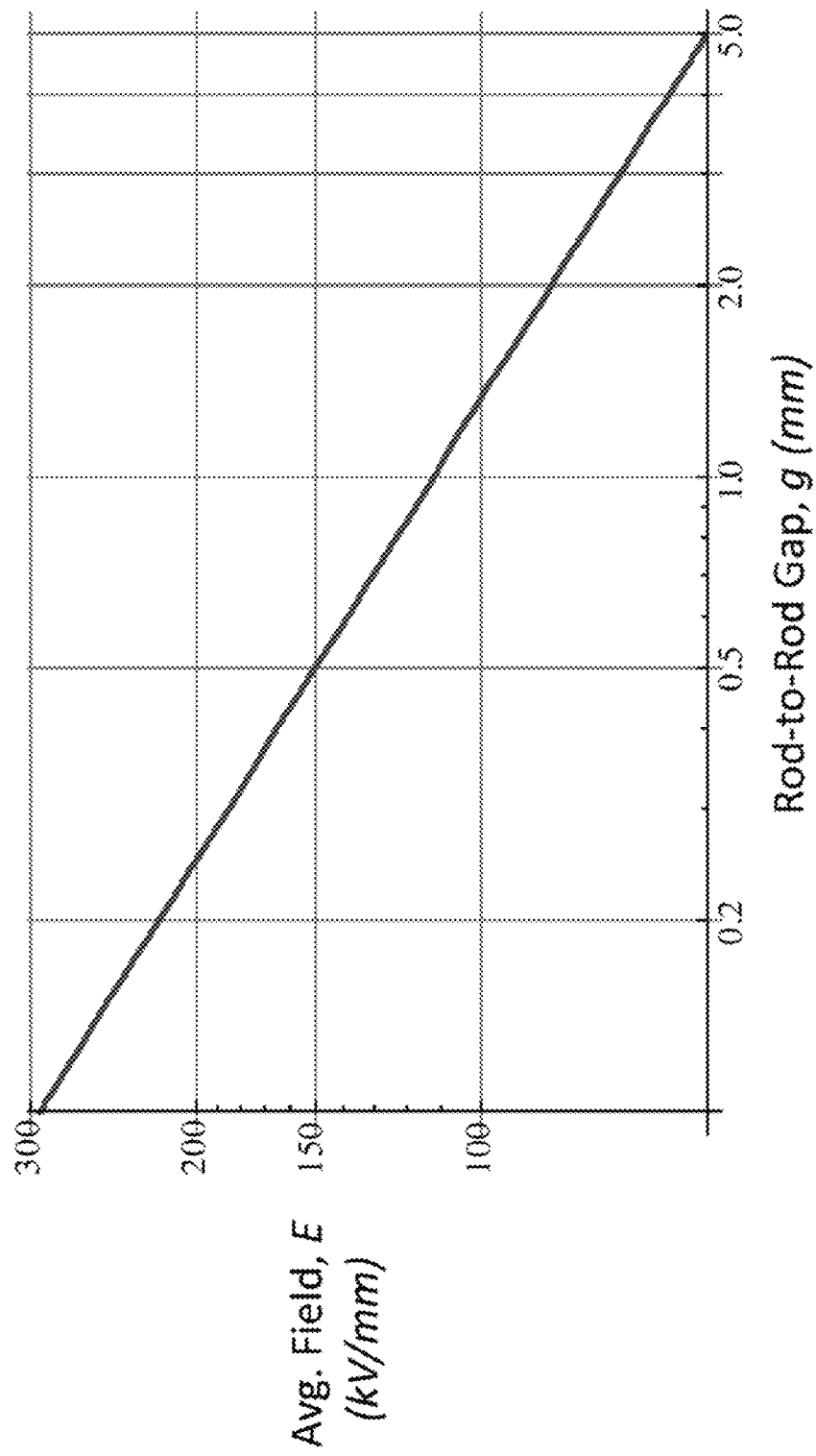
FIG. 9 shows a log-log plot of the average voltage gradient versus gap, as calculated from the linear fit shown in FIG. 8.

That such an extrapolation is credible can be seen from the plot shown in FIG. 9, which depicts the magnitude of the average voltage gradient between the rods as a function of the rod-to-rod gap, g. The calculation used to generate FIG. 9 involved taking the derivative of $V_{breakdown}$ [Equation (2)], with respect to the rod-to-rod gap, g, resulting in Equation (3):

$$\langle |E| \rangle \propto \frac{\partial V_{breakdown}}{\partial g} = m \times n \times g^{n-1} = \frac{n \times V_{breakdown}}{g} \qquad (3)$$

It is clear that this estimate of the electric field is consistent with the magnitude of Poisson's Equation, $|E|=|-\nabla\phi|$. As can be seen from the plot in FIG. 9, the calculated average gradient decreases monotonically with increases in the gap dimension. Equivalently, the magnitude of the electric field within a rod-rod capacitor decreases with decreasing separation of the rods, as expected.

The second, and very significant, advantage of the rod-rod ES device embodiment is that, contrary to the strip-strip system of the prior art, the gap, g, increases monotonically as the rod-rod capacitance decreases with lateral displacement, d. (Recall, as shown in FIG. 6A, the displacement, d, is equivalent to the distance measured along an arc at a radius, r, at which is comprised the annular ring of rods.) This behavior continues until the rotor rod rotates through an excursion whereby each respective rotor rod in the array approaches the midway point between its respective, opposing stator rod and the following opposing stator rod along the stator annular array (depicted in FIG. 6A by rotor elements 610 and 615). In an actual device, therefore, one must consider the effects of both nearest-neighbor stator rods as the rotor rod begins to experience sufficient capacitive effects due to the presence of the combined pair of opposing stator rods. This functional dependence implies that the voltage-holding ability of the rod-rod ES device embodiment will increase as the capacity decreases.

Figure 10:
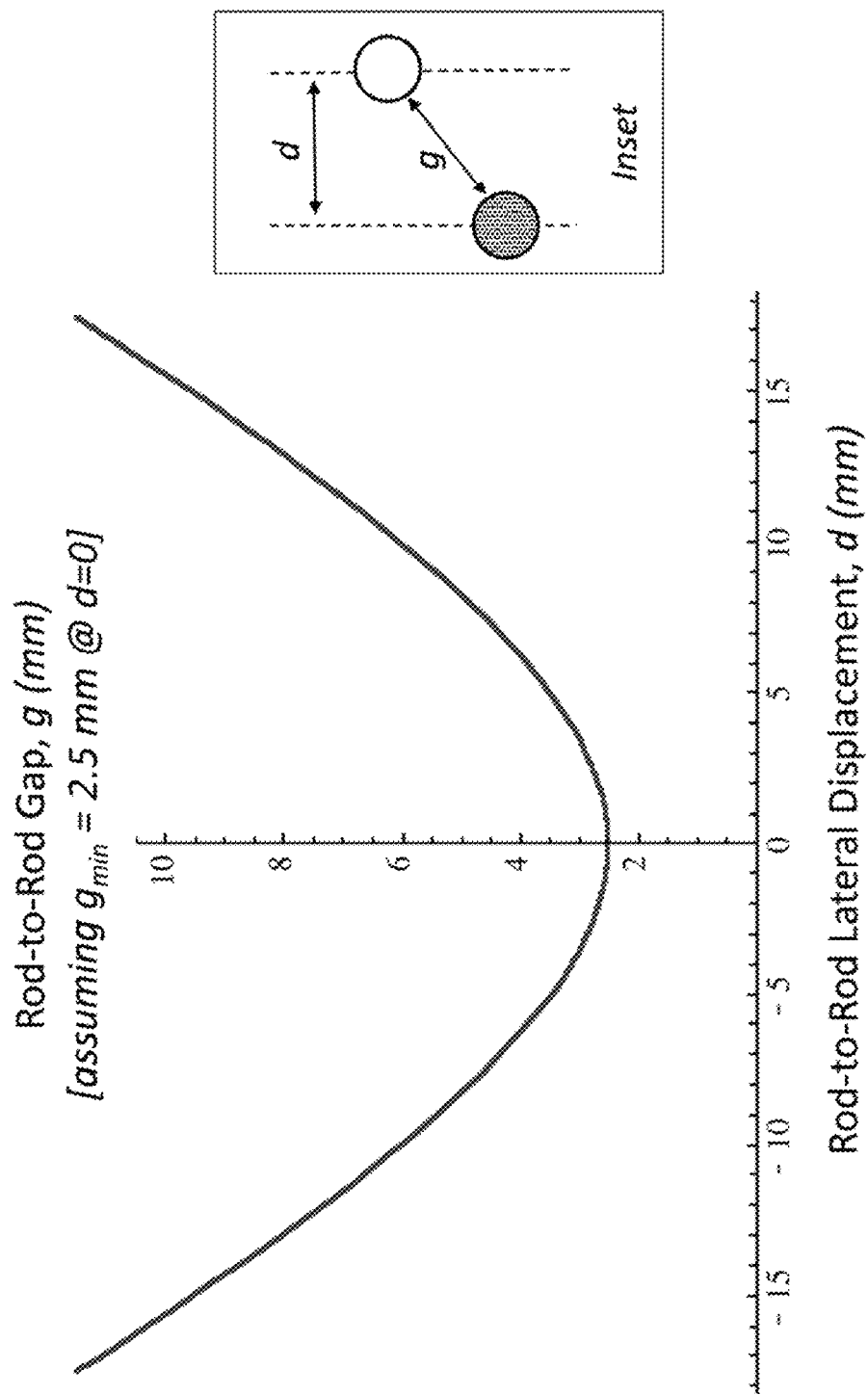
FIG. 10 shows a plot of the rod-rod gap as a function of lateral displacement of the rotor from its position of maximum capacity, assuming a 2.5 mm minimum gap. The inset indicates the dimensional variables, g and d.

The analysis that resulted in the plot shown in FIG. 7, namely, the variation of capacity with the lateral rod-to-rod displacement, can also be used to calculate the increase in the rod-to-rod gap, g, with lateral displacement, d (these variables are indicated in the inset). FIG. 10 is a plot showing the functional dependence just described. As can be seen, over the range covered by the plot of FIG. 10, the gap, g, increases monotonically with the displacement, d. Concomitantly, the voltage-holding (i.e., voltage-standoff) ability also increases, the latter, as shown earlier in FIG. 8. Since the power output of an ES device scales as the square of the operating voltage, the embodiments described herein provide far superior performance capabilities, relative to the prior art. Specifically, the stator/rotor ES device using rod-like electrodes can accommodate a greater operating voltage than that of the strip-strip analog, owing to the fact that $V_{breakdown}$ is greater using the exemplary embodiment herein, relative to that in the prior art.

FIG. 10 shows a plot of the rod-rod gap as a function of lateral displacement of the rotor from its position of maximum capacity, assuming a 2.5 mm minimum gap. The inset indicates the dimensional variables, g and d.

Figures 11A, 11B:
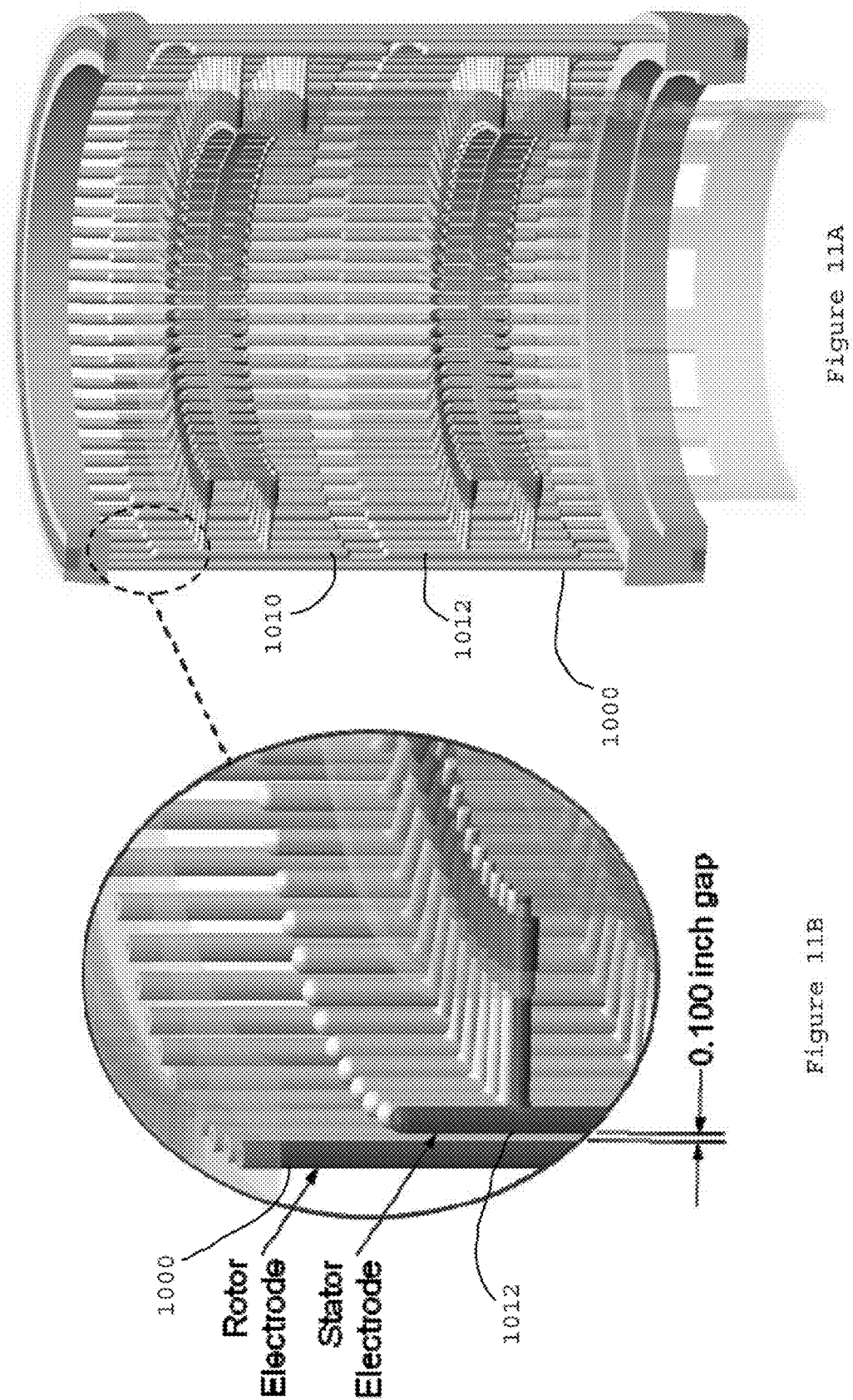
FIG. 11A shows a side view one half of the overall cylindrical shape of a tube configuration of the present invention.
FIG. 11B shows a magnified cutaway view of a section of rotor and stator of FIG. 11A.

FIG. 11A shows a side view one half of the overall cylindrical shape of a tube configuration of the present invention. The figure shows rotor 1000 and two sets of stators 1010 and

1012. FIG. 11B shows a magnified cutaway view of a section of rotor 1000 and stator 1010 of FIG. 11A. Thus in this figure, as similarly in FIGS. 6A-C, the rotor 1000 is configured to rotate about a central axis and rotor is located at a first radius from this axis. The first stator 1010 and the second stator 1012 are both located at a second radius from the central axis, wherein the first radius is larger than said second radius. A gap exists between the rotor and the first stator and between the rotor and the second stator such that upon rotation of the rotor, the gap between the rotor and the first stator and between the rotor and the second stator changes monotonically. The figure shows the rotor as comprising first plurality of axially parallel rods, the first stator as comprising a second plurality of axially parallel rods and the second stator as comprising a third plurality of axially parallel rods. In another embodiment not shown, the rotor and both stators comprise corrugations. The rotor comprises electrically conductive material and is electrically isolated. The first and second stators also comprise electrically conductive material. A first variable capacitor is formed by the spaced apart first stator and rotor. A second variable capacitor is formed by the spaced apart second stator and rotor. A series-resonant electrical circuit is formed in a circuit connected from the first variable capacitor, through the rotor to the second variable capacitor. The capacities of the first capacitor and the second capacitor vary at a first frequency as the rotor rotates. The series-resonant circuit comprises a resonant frequency that varies over a band of frequencies as the rotor rotates. Parametric resonance occurs when the first frequency overlaps the band of frequencies. The configuration can be electrically connected in a variety of circuits to form the series-resonant circuit. Such circuits will be apparent to those skilled in the art upon understanding the teachings herein. For example, the configuration can be used with the circuit of FIG. 2. In such case, the first inductor is electrically connected to the first variable capacitor. The second inductor is electrically connected to the second variable capacitor. A circuit connected from the first inductor, through the first capacitor and the second capacitor to the second inductor comprises a series resonant circuit having a resonant frequency that varies over a band of frequencies as the rotor rotates. The first inductor comprises a first inductance and the second inductor comprises a second inductance. These inductances are selected so that said band of frequencies overlaps the frequency of capacitance variation in the first capacitor and the second capacitor at a desired rotation speed of the rotor. Energy can be coupled in and out of the system in a variety of ways. For example, energy can be coupled out by connecting a first capacitor between the first inductor and the first variable capacitor and further connecting a second capacitor between the second inductor and the second variable capacitor. A load can be connected between the first capacitor and the second capacitor. Conversely, a driver circuit connected between the first capacitor and the second capacitor can couple energy into the system.

Figure 12A:
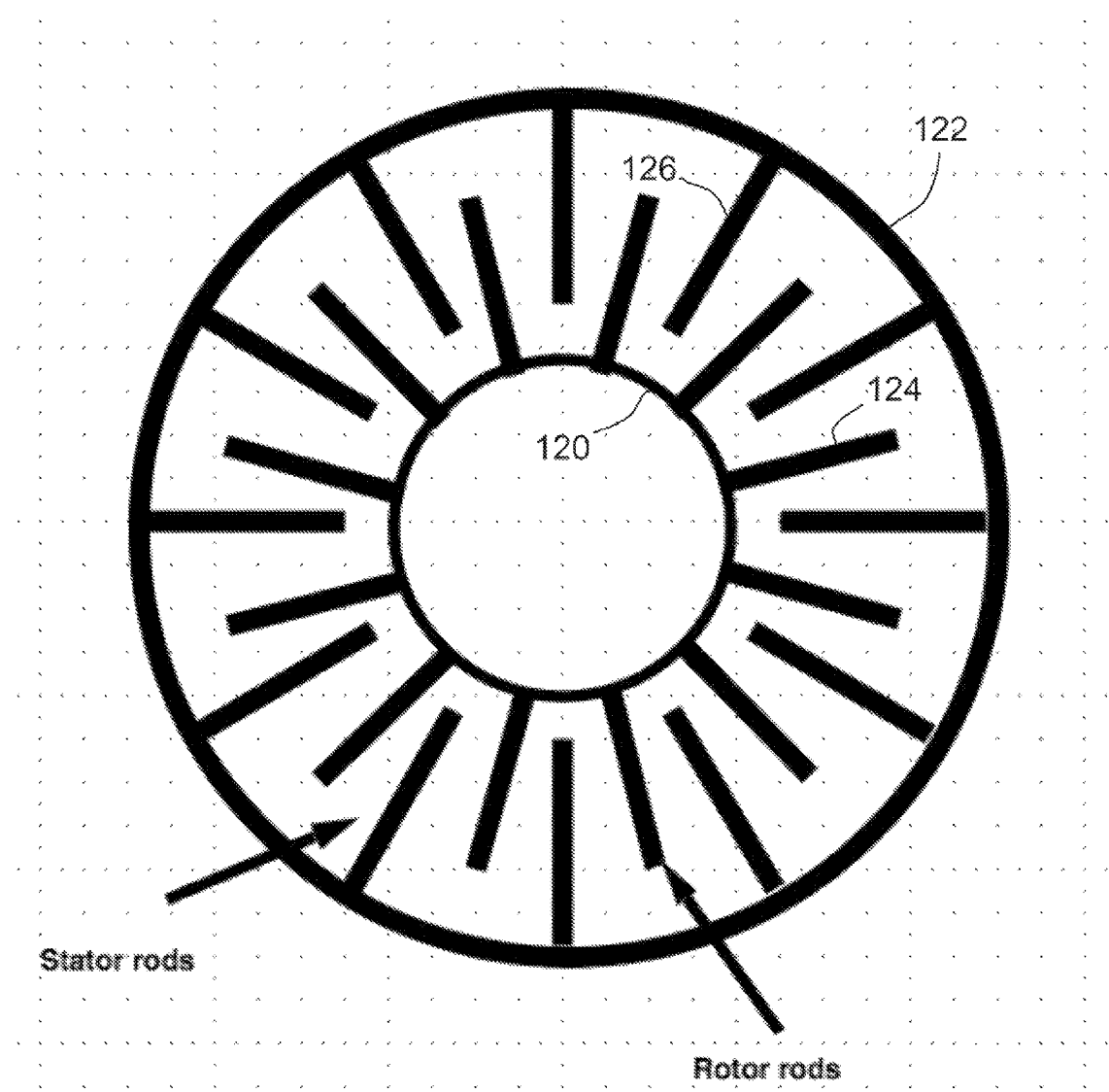
FIG. 12A shows a schematic drawing of a top view of another embodiment of the invention.
Figure 12B:
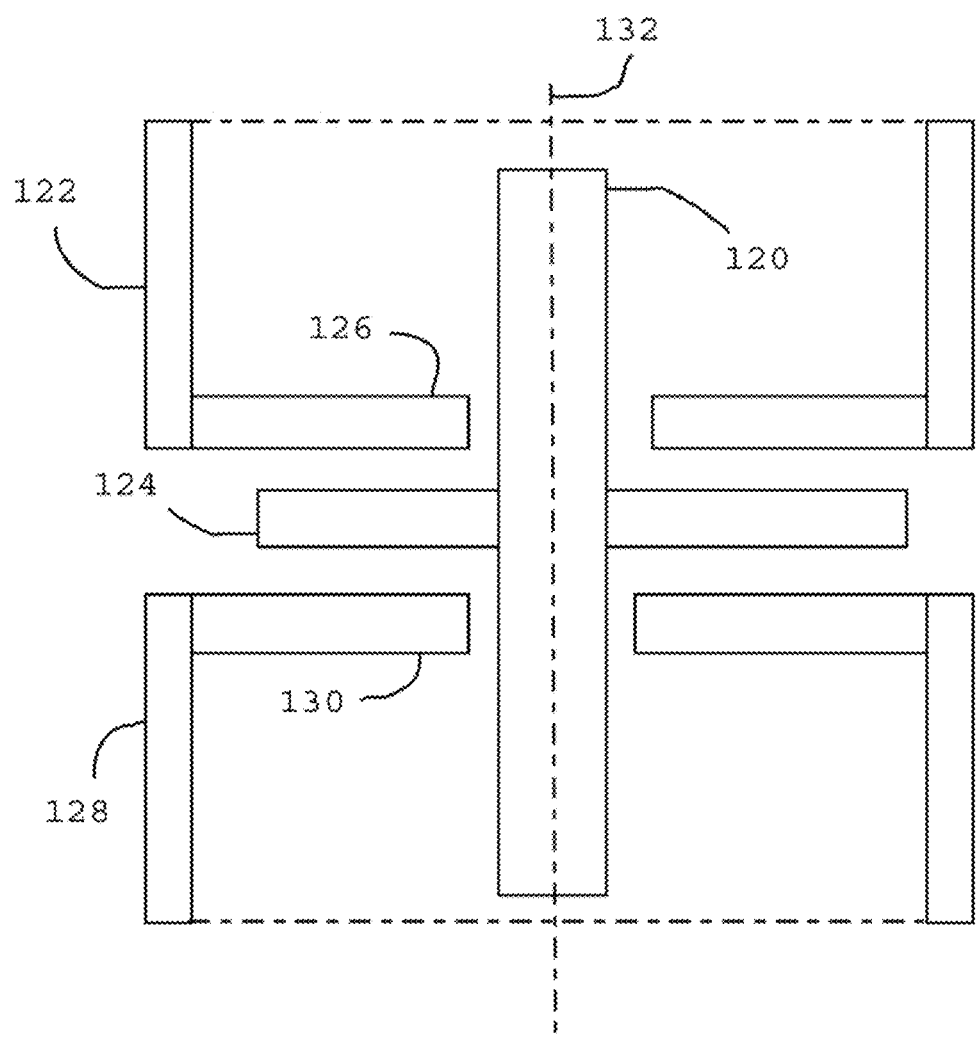
FIG. 12B shows a cross-sectional side view of the embodiment of FIG. 12A.

FIG. 12A shows a schematic drawing of a top view of another embodiment of the invention. It shows a rotor 120 and a stator 122. Rotor 120 is rotatable about a central axis, and includes a first set of rods 124 that extend away from the central axis. The first stator 122 comprises a second set of rods 126 that extends toward the central axis. FIG. 12B shows a cross-sectional side view of the embodiment of FIG. 12A. This figure shows the second stator 128 which includes a third set of rods 130 that extends toward the central axis 132. Rods 124 are rotatable between rods 126 and 130. As the rotor rotates, a first variable gap between rods 124 and 126 changes monotonically and a second variable gap between rods 124 and 130 changes monotonically. The rotor and both stators comprise electrically conductive material. The rotor is electrically isolated. The first stator and the rotor form a first variable capacitor and the second stator and the rotor form a second variable capacitor. A series-resonant electrical circuit is, e.g., as shown in FIG. 2, is formed in a circuit connected from the first variable capacitor, through the rotor to the second variable capacitor. The capacities of the first capacitor and the second capacitor vary at a first frequency as the rotor rotates and the series-resonant circuit comprises a resonant frequency that varies over a band of frequencies as the rotor rotates. Parametric resonance occurs when the first frequency overlaps said band of frequencies. Note that FIG. 12B, as well as FIG. 6C, show a single "cell" of the device. Additional cells can be included. For example, the embodiment of FIG. 12B can be augmented by stacking one or more additional rotor/stator pairs above and below those shown. Each additional set of stator rods would be connected to its own stator, thereby enabling the formation of one or more additional variable capacitors. In FIG. 6C, the length of the rotor rods can be sufficient to rotate around one or more added sets of stator rods, again forming one or more additional variable capacitors.

In summary, this invention teaches preferred electrode embodiments that result in improved ES device performance, relative to the electrode embodiments described in the cited art. The present configuration, when augmented with the parametric resonance drive mechanisms cited in the prior art, should permit operation at substantially higher peak electrode-to-electrode voltages. The exemplary rod-based device embodiments described herein result in a quadratic increase in the power output of ES generators relative to prior-art electrode geometries, the latter including, but not limited to, strip-type and planar-based electrode elements, assuming comparable device capacitances and operating frequencies.

The skilled artesian will appreciate the following device and system augmentations. The "parametric resonance" drive mechanism can be utilized to provide further device enhancements (e.g., lower required voltages, etc.). The "parametric resonant" LC frequency can be servo-controlled, via the control of the charging inductor. Novel materials: meta-structures, smart materials, nonlinear E-field effects, etc. can possibly enhance ES device performance. The drive waveforms can be programmed (fuzzy logic, genetic algorithms,) and/or periodically reversed to control the direction of the rotor, as well as to realize an agitation modality, whereby the motor repeatedly and cyclically rotates in one sense, followed by a reverse sense continuously. The teachings of invention can be scaled to motors and generators, ranging over orders of magnitude in size and in torque requirements. Hence, using the teachings herein, large-scale energy storage flywheels can be realized, as well as nanotechnology devices, including MEMS, NEMS, microfluidic devices, remotely driven micromotors for robotic and medical manipulators, and specialized applications, including those subjected to severe environmental conditions (EMI, radiation, microgravity, large accelerations, etc.), as well as linear translation device analogs.

It is to be noted that the implementation of the above notions may define a parameter space with conflicting design rules. Hence, tradeoffs will, most likely exist, given the constrained design space, vis-à-vis the relative priorities of the ES device for a given application need.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. An apparatus, comprising:
a rotor configured to rotate about a central axis, wherein said rotor has a first diameter, wherein said rotor comprises a first support ring oriented in a first plane that is perpendicular to said central axis and further comprises a second support ring oriented in a second plane that is perpendicular to said central axis, wherein said first plane and said second plane are parallel one to another, wherein said rotor further comprises a first plurality of rod shaped electrodes, wherein each rod thereof is parallel to all other rods thereof and to said central axis and has a first end and a second end, wherein each said first end is fixedly connected to said first support ring and each said second end is fixedly connected to said second support ring, wherein all of the rods of said first plurality of rod shaped electrodes are in electrical contact with each other rod of said first plurality of rods and wherein there is no direct electrical connection from any other element to said first plurality of rod shaped electrodes;
a first stator and a second stator, wherein said first stator has a second diameter and is centered on said central axis, wherein said second stator has a third diameter and is centered on said central axis, wherein said second diameter and said third diameter are equal, wherein said first diameter is larger than both said second diameter and said third diameter, wherein said first stator comprises a second plurality of rod shaped electrodes, wherein all of the rods of said second plurality of rod shaped electrodes are physically parallel one to another, are in electrical contact one to another, are oriented to be parallel with said central axis and are evenly spaced around said central axis, wherein said second stator comprises a third plurality of rod shaped electrodes, wherein all of the rods of said third plurality of rod shaped electrodes are physically parallel one to another, are in electrical contact one to another, are oriented to be parallel with said central axis and are evenly spaced around said central axis, wherein said first stator is spaced from said second stator on said central axis, wherein the rods of said first plurality of rod shaped electrodes are physically parallel to the rods of said second plurality of rod shaped electrodes and said third plurality of rod shaped electrodes, wherein said rotor is rotatable only on the outside of said first stator and said second stator, both of which are within the inner diameter of said rotor, wherein there is no direct physical or electrical contact between said rotor and said first stator and between said rotor and said second stator;
wherein said first plurality of rod shaped electrodes together with said second plurality of rod shaped electrodes form a first variable capacitor, wherein said first plurality of rod shaped electrodes together with said third plurality of rod shaped electrodes form a second variable capacitor; and
a series-resonant circuit comprising a source of positive voltage electrically connected through a first inductor to said first variable capacitor which is connected to said second variable capacitor which is connected through a second inductor to a source of negative voltage, wherein said first plurality of rod shaped electrodes are at virtual ground and wherein said rotor is electrically isolated.

2. The apparatus of claim 1, wherein the capacities of said first variable capacitor and said second variable capacitor vary at a first frequency as said rotor rotates, wherein said series-resonant circuit comprises a resonant frequency that varies over a band of frequencies as said rotor rotates, wherein parametric resonance occurs when said first frequency overlaps said band of frequencies.

3. The apparatus of claim 2, wherein said first inductor comprises a first inductance, wherein said second inductor comprises a second inductance, wherein said first inductance and said second inductance are selected so that said band of frequencies overlaps the frequency of capacitance variation in said first capacitor and said second capacitor at a desired rotation speed of said rotor.

4. The apparatus of claim 3, further comprising a load connected between said first capacitor and said second capacitor.

5. The apparatus of claim 3, further comprising a driver circuit connected between said first capacitor and said second capacitor.

6. The apparatus of claim 3, further comprising means for coupling energy out of said circuit.

7. The apparatus of claim 3, further comprising means for coupling energy into said circuit.

8. The apparatus of claim 1, further comprising means for coupling energy out of said circuit.

9. The apparatus of claim 1, further comprising means for coupling energy into said circuit.

10. A method, comprising:
providing the apparatus of claim 1; and
rotating said rotor about said central axis at a rotational speed such that the capacities of said first capacitor and said second capacitor vary at a frequency such that parametric resonance occurs.

11. The method of claim 10, wherein the capacities of said first variable capacitor and said second variable capacitor vary at a first frequency as said rotor rotates, wherein said series-resonant circuit comprises a resonant frequency that varies over a band of frequencies as said rotor rotates, wherein parametric resonance occurs when said first frequency overlaps said band of frequencies.

12. The method of claim 11, wherein said first inductor comprises a first inductance, wherein said second inductor comprises a second inductance, wherein said first inductance and said second inductance are selected so that said band of frequencies overlaps the frequency of capacitance variation in said first capacitor and said second capacitor at a desired rotation speed of said rotor.

13. The method of claim 12, further comprising a load connected between said first capacitor and said second capacitor.

14. The method of claim 12, further comprising a driver circuit connected between said first capacitor and said second capacitor.

15. The method of claim 12, further comprising coupling energy out of said circuit.

16. The method of claim 12, further comprising coupling energy into said circuit.

17. The method of claim 10, further comprising coupling energy out of said circuit.

18. The method of claim 10, further comprising coupling energy into said circuit.

* * * * *